(12) United States Patent
Liu et al.

(10) Patent No.: US 11,258,545 B2
(45) Date of Patent: Feb. 22, 2022

(54) COUNTING METHOD AND COMMUNICATIONS APPARATUS

(71) Applicant: Huawei Technologies Co., Ltd., Shenzhen (CN)

(72) Inventors: Xing Liu, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/779,190

(22) Filed: Jan. 31, 2020

(65) Prior Publication Data

US 2020/0169359 A1 May 28, 2020

Related U.S. Application Data

(63) Continuation of application No. PCT/CN2018/097740, filed on Jul. 30, 2018.

(30) Foreign Application Priority Data

Aug. 2, 2017 (CN) .......................... 201710652768.0

(51) Int. Cl.
*H04L 1/18* (2006.01)
*H04W 76/18* (2018.01)
*H04W 80/02* (2009.01)

(52) U.S. Cl.
CPC .......... *H04L 1/1819* (2013.01); *H04L 1/1816* (2013.01); *H04W 76/18* (2018.02); *H04W 80/02* (2013.01)

(58) Field of Classification Search
None
See application file for complete search history.

(56) References Cited

U.S. PATENT DOCUMENTS

2009/0092131 A1  4/2009  Hu et al.
2009/0323592 A1  12/2009  Terry
(Continued)

FOREIGN PATENT DOCUMENTS

CN  1667993 A  9/2005
CN  1992717 A  7/2007
(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.3.0, pp. 1-460, 3rd Generation Partnership Project, Valbonne, France (Jun. 2017).
(Continued)

*Primary Examiner* — Otis L Thompson, Jr.
(74) *Attorney, Agent, or Firm* — Leydig, Voit & Mayer, Ltd.

(57) ABSTRACT

A counting method and a communications apparatus are provided. The method includes: determining to retransmit a first protocol layer data packet; and if the retransmission is retransmission for the first time, initializing a retransmission counter associated with the first protocol layer data packet; or if the retransmission is not retransmission for the first time and the first protocol layer data packet is not pending for retransmission, updating the retransmission counter or keeping a value of the retransmission counter unchanged. In this way, RLF can be correctly triggered, to reduce a quantity of times of unnecessary RLF triggering and reduce overheads.

30 Claims, 7 Drawing Sheets

(56) References Cited

U.S. PATENT DOCUMENTS

| | | | |
|---|---|---|---|
| 2014/0092770 A1 | 4/2014 | Terry et al. | |
| 2015/0382395 A1* | 12/2015 | Yang | H04W 76/19 370/216 |
| 2017/0207883 A1* | 7/2017 | Bergquist | H04W 24/10 |
| 2017/0295584 A1* | 10/2017 | Uchino | H04L 1/1819 |

FOREIGN PATENT DOCUMENTS

| | | |
|---|---|---|
| CN | 101132260 A | 2/2008 |
| CN | 101374038 A | 2/2009 |
| CN | 101594219 A | 12/2009 |
| CN | 101971690 A | 2/2011 |
| CN | 102315924 A | 1/2012 |
| CN | 106375069 A | 2/2017 |
| JP | 2007089177 A | 4/2007 |
| JP | 2009165187 A | 7/2009 |
| JP | 2010278588 A | 12/2010 |
| JP | 2011507402 A | 3/2011 |
| RU | 2621726 C2 | 6/2017 |
| WO | 2016209896 A1 | 12/2016 |

OTHER PUBLICATIONS

"3rd Generation Partnership Project; Technical Specification Group Radio Access Network; Evolved Universal Terrestrial Radio Access (E-UTRA); Radio Resource Coi irol (RRC); Protocol specification (Release 14)," 3GPP TS 36.331 V14.3.0, pp. 1-745, 3rd Generation Partnership Project, Valbonne, France (Jun. 2017).

"3rd Generation Partnership Project; Technical Specification Group Radio Access Network; NR; Radio Link Control (RLC) protocol specification (Release 15)," 3GPP TS 38.322 V0.2.0, pp. 1-30, 3rd Generation Partnership Project, Valbonne, France (Jul. 2017).

JP/2020-505461, Notice of Reasons for Rejection, dated Apr. 12, 2021.

KR/10-2020-7004999, Office Action, dated Mar. 15, 2021.

LG Electronics Inc., "RLC AM for NB-IOT," 3GPP TSG-RAN WG2 NB-IOT AdHoc Meeting, Budapest, Hungary, R2-160453, total 3 pages, 3rd Generation Partnership Project, Valbonne, France (Jan. 19-21, 2016).

* cited by examiner

COUNTING METHOD AND COMMUNICATIONS APPARATUS

CROSS-REFERENCE TO RELATED APPLICATIONS

This application is a continuation of International Application No. PCT/CN2018/097740, filed on Jul. 30, 2018, which claims priority to Chinese Patent Application No. 201710652768.0, filed on Aug. 2, 2017. The disclosures of the aforementioned applications are hereby incorporated by reference in their entireties.

TECHNICAL FIELD

Embodiments of this application relate to the field of mobile communications technologies, and in particular, to a counting method and a communications apparatus.

BACKGROUND

In long term evolution (LTE), as recorded in the 3GPP TS 36.322 protocol, a radio link control (RLC) layer is responsible for an automatic repeat request (ARQ). For each RLC protocol data unit (PDU), each RLC PDU segment, or each RLC PDU portion, that needs to be retransmitted, the RLC layer maintains a retransmission counter for a PDU, to record a total quantity of times of retransmission of the RLC PDU or the RLC PDU segment or the RLC PDU portion that corresponds to the PDU. When the retransmission counter reaches a preset threshold, radio link reestablishment is triggered.

In LTE, an RLC layer of a sending end transfers, to a media access control (MAC) layer of the sending end based on a request from the MAC layer, an RLC PDU, or RLC PDU segment, or RLC PDU portion that needs to be retransmitted. Then the MAC layer immediately sends, to a receiving end, the RLC PDU, or RLC PDU segment, or RLC PDU portion that needs to be retransmitted; and the RLC layer locally deletes the RLC PDU, or RLC PDU segment, or RLC PDU portion that needs to be retransmitted.

In 5th generation (5G) communication, to improve a processing speed, a preprocessing concept is introduced. An RLC layer of a sending end does not wait for a request from a MAC layer of the sending end. Instead, the RLC layer of the sending end directly transfers an RLC PDU, or RLC PDU segment, or RLC PDU portion that needs to be retransmitted to the MAC layer. The MAC layer buffers the RLC PDU, or RLC PDU segment, or RLC PDU portion that needs to be retransmitted after performing a preprocessing operation, including adding a MAC packet header, on the RLC PDU, or RLC PDU segment, or RLC PDU portion. The MAC layer may not immediately send the RLC PDU, or RLC PDU segment, or RLC PDU portion, but performs the sending only when determining that the RLC PDU, or RLC PDU segment, or RLC PDU portion is needed to be sent.

When preprocessing is introduced, if the retransmission counting method of LTE is still used, radio link reestablishment may be incorrectly triggered.

SUMMARY

This application provides a counting method and a communications apparatus to improve a case in which radio link reestablishment is incorrectly triggered.

According to a first aspect, this application provides a counting method, including: determining to retransmit a first protocol layer data packet; and if the retransmission is retransmission for the first time, setting the first protocol layer data packet to pending for retransmission and initializing a retransmission counter associated with the first protocol layer data packet; or if the retransmission is not retransmission for the first time and the first protocol layer data packet is not pending for retransmission, setting the first protocol layer data packet to pending for retransmission and updating the retransmission counter or keeping a value of the retransmission counter unchanged; or if the first protocol layer data packet is pending for retransmission and a second protocol layer indicates that the first protocol layer data packet has been sent, setting the first protocol layer data packet to not pending for retransmission. In LTE, after a first protocol layer sends a first protocol layer data packet to a second protocol layer, the second protocol layer immediately sends the first protocol layer data packet. Therefore, after sending the data packet, the first protocol layer immediately sets a status of the first protocol layer data packet to not pending for retransmission, for example, "locally deleted". In future communication, after a first protocol layer sends a first protocol layer data packet to a second protocol layer, the second protocol layer may not immediately send the first protocol layer data packet. Therefore, if the first protocol layer sets the status of the first protocol layer data packet to not pending for retransmission immediately after sending the first protocol layer data packet to the second protocol layer, the status of the first protocol layer data packet is incorrectly set. In this application, after sending the first protocol layer data packet to the second protocol layer, when receiving information from the second protocol layer indicating that the first protocol layer data packet has been sent, the first protocol layer sets the first protocol layer data packet to not pending for retransmission, thereby avoiding incorrect setting of the status of the first protocol layer data packet and ensuring correctness of retransmission processing.

Optionally, the method may be performed by a communications apparatus, where the communications apparatus may be a terminal, a chip of a terminal, a base station, a chip in a base station, a central unit (CU), a chip in a CU, a distributed unit (DU), a chip in a DU, or the like.

The CU and the DU mean that, in a distributed radio access network, a CU-DU architecture is introduced to reduce costs of deploying an access network device, and a radio access network side of the distributed radio access network is divided into a CU and a DU. Radio resource control (RRC) and packet data convergence protocol (PDCP) protocol stacks are distributed on the CU; and radio link control (RLC) and medium access control (MAC) protocol stacks are distributed on the DU. In an embodiment of this application, there is another manner of dividing protocol stacks on the CU and the DU. For example, based on a network configuration, during deployment of the CU and the DU, alternatively RRC may be distributed on the CU through division, and PDCP, RLC, and MAC protocol stacks may be distributed on the DU through division. For another specific manner of dividing protocol stacks between the CU and the DU, refer to TR 38.801 v14.0.0. Generally, one CU may be connected to a plurality of DUs.

In a possible design, the setting the first protocol layer data packet to pending for retransmission is: storing the first protocol layer data packet in a first protocol layer retransmission buffer; that the first protocol layer data packet is not pending for retransmission is: the first protocol layer data packet is not stored in the first protocol layer retransmission buffer; the setting the first protocol layer data packet to not pending for retransmission is: deleting the first protocol layer data packet from the first protocol layer retransmission buffer; and that the first protocol layer data packet is pending for retransmission is: the first protocol layer data packet is stored in the first protocol layer retransmission buffer. The method uses the first protocol layer retransmission buffer to record the status of the first protocol layer data packet. To be specific, when the first protocol layer retransmission buffer includes the first protocol layer data packet, the status of the first protocol layer data packet is pending for retransmission; or when the first protocol layer retransmission buffer does not include the first protocol layer data packet, the status of the first protocol layer data packet is not pending for retransmission. The method is easy to implement.

In a possible design, the indicating, by a second protocol layer, that the first protocol layer data packet has been sent is: after the first protocol layer data packet is sent over an air interface, indicating, by the second protocol layer, that the first protocol layer data packet has been sent; or after the second protocol layer transfers the first protocol layer data packet to a physical layer, indicating, by the second protocol layer, that the first protocol layer data packet has been sent; or after hybrid automatic repeat request (HARQ) retransmission is performed, indicating, by the second protocol layer, that the first protocol layer data packet has been sent. The method provides several implementations of indicating that the first protocol layer data packet has been sent, and the implementations may be flexibly selected based on an actual requirement during actual use.

In a possible design, the determining to retransmit a first protocol layer data packet is: receiving information indicating that the first protocol layer data packet fails to be transmitted.

In a possible design, the first protocol layer data packet is transferred to the second protocol layer.

According to a second aspect, this application provides a counting method, including: determining to retransmit a first protocol layer data packet; and if the retransmission is retransmission for the first time, transferring the first protocol layer data packet to a second protocol layer and initializing a retransmission counter associated with the first protocol layer data packet; or if the retransmission is not retransmission for the first time and the second protocol layer indicates that the first protocol layer data packet is not pending for transmission or not being transmitted, transferring the first protocol layer data packet to the second protocol layer and updating the retransmission counter or keeping a value of the retransmission counter unchanged. In the method, when the second protocol layer indicates that the first protocol layer data packet is not pending for transmission or not being transmitted, it indicates that the second protocol layer does not have the first protocol layer data packet. Therefore, the first protocol layer may transfer the first protocol layer data packet to the second protocol layer and count the retransmission. In the method, the first protocol layer may count the retransmission based on an indication from the second protocol layer. The method is easy to implement.

With reference to the first aspect, or with reference to a possible design of the first aspect, or with reference to the second aspect, in another possible design, the updating the retransmission counter is: incrementing the retransmission counter by 1.

With reference to the first aspect, or with reference to a possible design of the first aspect, or with reference to the second aspect, in another possible design, the updating the retransmission counter includes: incrementing the retransmission counter by 1; or if the second protocol layer instructs to segment the first protocol layer data packet, incrementing the retransmission counter by N−1, where N is a quantity of segments of the first protocol layer data packet.

With reference to the first aspect, or with reference to a possible design of the first aspect, or with reference to the second aspect, in another possible design, the first protocol layer data packet is a segment of a radio link control (RLC) protocol data unit (PDU); and the updating the retransmission counter or keeping a value of the retransmission counter unchanged includes: if the first protocol layer data packet is the first data packet in one retransmission of the PDU, incrementing the retransmission counter by 1; or if the first protocol layer data packet is an $M^{th}$ data packet in one retransmission of the PDU, keeping the value of the retransmission counter unchanged, where M is an integer greater than 1.

With reference to the first aspect, or with reference to a possible design of the first aspect, or with reference to the second aspect, in another possible design, the first protocol layer data packet is a segment of an RLC PDU; and the updating the retransmission counter or keeping a value of the retransmission counter unchanged includes: if the first protocol layer data packet is the first data packet of the PDU in a status report, incrementing the retransmission counter by 1; or if the first protocol layer data packet is an $L^{th}$ data packet of the PDU in a status report, keeping the value of the retransmission counter unchanged, where L is an integer greater than 1.

With reference to the first aspect, or with reference to a possible design of the first aspect, or with reference to the second aspect, in another possible design, the first protocol layer data packet is a segment of an RLC PDU; and the updating the retransmission counter or keeping a value of the retransmission counter unchanged includes: if the first protocol layer data packet is the first data packet of the PDU in a transport block, incrementing the retransmission counter by 1; or if the first protocol layer data packet is a $K^{th}$ data packet of the PDU in a transport block, keeping the retransmission counter unchanged, where K is an integer greater than 1.

With reference to the first aspect, or with reference to a possible design of the first aspect, or with reference to the second aspect, in another possible design, indication information is received; and the updating the retransmission counter or keeping a value of the retransmission counter unchanged includes: updating the retransmission counter or keeping the value of the retransmission counter unchanged based on the indication information.

The foregoing provides several methods for updating the retransmission counter or keeping the value of the retransmission counter unchanged. A corresponding counting method may be selected based on actual use.

With reference to the first aspect, or with reference to a possible design of the first aspect, or with reference to the second aspect, in another possible design, if the first protocol layer data packet is successfully retransmitted, the retransmission counter is reset. In this way, when the first protocol layer data packet is successfully retransmitted, the retransmission counter is reset, thereby reducing a quantity of times of triggering radio link failure and helping to improve system performance.

In any one of the foregoing possible designs, the first protocol layer data packet is retransmitted in a primary cell. In this way, only a data packet retransmitted in a relatively important primary cell is counted, but a data packet retransmitted in a secondary cell not so important is not counted, thereby reducing system overheads.

According to a third aspect, this application provides a communications apparatus. The communications apparatus has a function of implementing the method performed by the communications apparatus in the foregoing method embodiments. The function may be implemented by hardware, or may be implemented by hardware executing corresponding software. The hardware or software includes one or more modules that correspond to the foregoing function.

In a possible design, the communications apparatus includes: a processor, a memory, a bus, and a communications interface, where a computer executable instruction is stored in the memory. The processor and the memory are connected to each other through the bus. When the communications apparatus runs, the processor executes the computer executable instruction stored in the memory, so that the communications apparatus performs the counting method according to any design of the first aspect. For example, the communications apparatus may be a terminal, a base station, a CU, a DU, or the like.

In another possible design, the communications apparatus may be a chip, for example, a chip of a terminal, a chip in a base station, a chip in a CU, or a chip in a DU. The chip includes a processing unit and, optionally, further includes a storage unit. The chip may be configured to perform the counting method according to any design of the first aspect.

According to a fourth aspect, this application provides a communications apparatus. The communications apparatus has a function of implementing the method performed by the communications apparatus in the foregoing method embodiments. The function may be implemented by hardware, or may be implemented by hardware executing corresponding software. The hardware or software includes one or more modules that correspond to the foregoing function.

In a possible design, the communications apparatus includes: a processor, a memory, a bus, and a communications interface, where a computer executable instruction is stored in the memory. The processor and the memory are connected to each other through the bus. When the communications apparatus runs, the processor executes the computer executable instruction stored in the memory, so that the communications apparatus performs the counting method according to any design of the second aspect. For example, the communications apparatus may be a terminal, a base station, a CU, a DU, or the like.

In another possible design, the communications apparatus may be a chip, for example, a chip of a terminal, a chip in a base station, a chip in a CU, or a chip in a DU. The chip includes a processing unit and, optionally, further includes a storage unit. The chip may be configured to perform the counting method according to any design of the second aspect.

According to a fifth aspect, this application provides a computer storage medium, storing a computer software instruction used by a terminal in the third aspect, where the computer software instruction includes a program that is used to execute the foregoing aspect and that is designed for the terminal in the third aspect.

According to a sixth aspect, this application provides a computer storage medium, storing a computer software instruction used by a terminal in the fourth aspect, where the computer software instruction includes a program that is used to execute the foregoing aspect and that is designed for the terminal in the fourth aspect.

According to a seventh aspect, this application provides a computer program product. The computer program product includes a computer software instruction. The computer software instruction can be loaded by using a processor to implement a procedure in the counting method according to any design of the first aspect.

According to an eighth aspect, this application provides a computer program product. The computer program product includes a computer software instruction. The computer software instruction can be loaded by using a processor to implement a procedure in the counting method according to any design of the second aspect.

In addition, for a technical effect brought by any one of the designs of the third aspect to the eighth aspect, refer to the technical effects brought by different designs of the first aspect or the second aspect. Details are not described herein again.

These aspects or other aspects in the present invention may be clearer and easier to understand in the following description of embodiments.

DESCRIPTION OF EMBODIMENTS

The following describes technical solutions of this application with reference to the accompanying drawings. A specific operation method in a method embodiment may also be applied to an apparatus embodiment or a system embodiment. In description of this application, "a plurality of" means two or more than two unless otherwise stated.

A network architecture and a service scenario described in embodiments of this application are intended to describe the technical solutions in the embodiments of this application more clearly, and do not constitute any limitation on the technical solutions provided in the embodiments of this application. A person of ordinary skill in the art may learn that, with evolution of network architectures and emergence of new service scenarios, the technical solutions provided in the embodiments of this application are also applicable to a similar technical problem.

Figure 1:
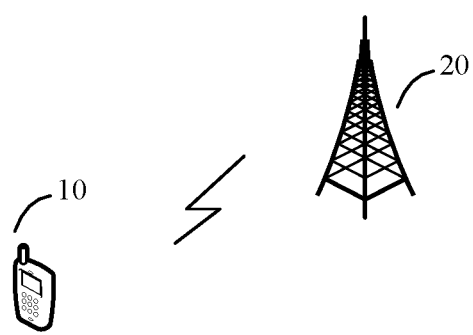
FIG. 1 is a schematic diagram of a system architecture to which this application is applicable.

FIG. 1 is a schematic diagram of a possible network architecture to which this application is applicable, including at least one terminal 10 communicating with a base station 20 through a wireless interface. For clarity, only one base station and one terminal device are shown in the figure.

The terminal is a device having a wireless transceiving function and may be deployed on land, including an indoor, outdoor, handheld or in-vehicle device; or may be deployed on a water surface (for example, in a ship); or may be deployed in the air (for example, in an airplane, a balloon, or a satellite). The terminal may be a mobile phone, a tablet (pad), a computer having a wireless transceiver function, a virtual reality (VR) terminal, an augmented reality (AR) terminal, a wireless terminal in industrial control, a wireless terminal in self-driving, a wireless terminal in remote medical treatment, a wireless terminal in a smart grid, a wireless terminal in transportation safety, a wireless terminal in a smart city, a wireless terminal in smart home, or the like.

The base station is a device that connects a terminal to a wireless network, including but not limited to: an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a next-generation NodeB (gNB), a transmitting and receiving point (TRP), a transmitting point (TP), a mobile switching center, or the like; and may further include a Wi-Fi access point (AP), or the like.

In this application, a first protocol layer may be, for example, an RLC layer; and a second protocol layer may be, for example, a MAC layer. A first protocol layer data packet may be, for example, an RLC PDU, or may be a segment of an RLC PDU (RLC PDU segment), or may be an RLC PDU portion (portion of RLC PDU). A first protocol layer retransmission buffer may also be referred to as an RLC retransmission buffer.

In LTE, an RLC layer is responsible for ARQ retransmission. For each RLC PDU that needs to be retransmitted, the RLC layer maintains a retransmission counter configured to record a quantity of times the RLC PDU has been retransmitted. Specific application is as follows: After an RLC layer of a sending end receives an RLC status report from a corresponding RLC layer of a receiving end, if the RLC layer of the sending end finds that missing of some RLC PDUs, or RLC PDU segments, or RLC PDU portions is reported in the status report, the RLC layer of the sending end determines that the RLC PDUs, or RLC PDU segments, or RLC PDU portions need to be retransmitted.

When the RLC layer determines that a RLC PDU, or RLC PDU segment, or RLC PDU portion needs to be retransmitted, the RLC layer puts the RLC PDU, or RLC PDU segment, or RLC PDU portion that needs to be retransmitted into an RLC retransmission buffer. The RLC retransmission buffer is specially used to temporarily store an RLC PDU, or RLC PDU segment, or RLC PDU portion that needs to be retransmitted. In addition, the RLC layer needs to initialize or update a retransmission counter corresponding to the RLC PDU, or RLC PDU segment, or RLC PDU portion.

If the RLC PDU, or RLC PDU segment, or RLC PDU portion is to be retransmitted for a first time, the retransmission counter is initialized to 0; if the RLC PDU, or RLC PDU segment, or RLC PDU portion is to be retransmitted not for the first time, the retransmission counter is incremented by 1.

It should be noted that, before putting the RLC PDU, or RLC PDU segment, or RLC PDU portion that needs to be retransmitted into the RLC retransmission buffer, the RLC layer determines whether there is a same RLC PDU, or RLC PDU segment, or RLC PDU portion waiting to be retransmitted, that is, whether there is already the same RLC PDU, or RLC PDU segment, or RLC PDU portion in the RLC retransmission buffer. If there is the same RLC PDU, or RLC PDU segment, or RLC PDU portion waiting to be retransmitted, the RLC layer does not put the RLC PDU, or RLC PDU segment, or RLC PDU portion that needs to be retransmitted into the RLC retransmission buffer and therefore does not update the retransmission counter corresponding to the RLC PDU, RLC PDU segment, or RLC PDU portion.

When the retransmission counter reaches a maximum retransmission count threshold (maxRetxThreshold), the RLC layer gives a report indicating that radio resource control (RRC) reaches a maximum quantity of retransmission times. The report is used to determine whether a radio link failure (RLF) is occurred.

When the base station performs uplink granting on the terminal, a MAC layer of the terminal requests based on an uplink grant size, an RLC layer of the base station to provide data for uplink transmission. Because a priority of a to-be-retransmitted PDU is higher than a priority of an initially transmitted PDU, an RLC layer of the terminal first transfers an RLC PDU, or RLC PDU segment, or RLC PDU portion that needs to be retransmitted to a MAC layer of the terminal for uplink transmission and at the same time deletes a corresponding RLC PDU, or RLC PDU segment, or RLC PDU portion buffered in an RLC retransmission buffer.

In 5G communication, to improve a processing speed, a preprocessing concept is introduced. An RLC layer of a sending end does not wait for a request from a MAC layer of the sending end. Instead, the RLC layer of the sending end directly transfers an RLC PDU, or RLC PDU segment, or RLC PDU portion that needs to be retransmitted to the MAC layer. The MAC layer buffers the RLC PDU, or RLC PDU segment, or RLC PDU portion that needs to be retransmitted after performing a preprocessing operation, including adding a MAC packet header, on the RLC PDU, or RLC PDU segment, or RLC PDU portion. The MAC layer may not immediately send the RLC PDU, or RLC PDU segment, or RLC PDU portion, but performs the sending only when determining that the RLC PDU, or RLC PDU segment, or RLC PDU portion is needed to be sent.

Therefore, when preprocessing is introduced, if the retransmission processing method and the retransmission counting method of LTE are directly used, retransmission is incorrectly counted, to incorrectly trigger RLF. This is because, in LTE, after a first protocol layer sends a first protocol layer data packet to a second protocol layer, the second protocol layer immediately sends the first protocol layer data packet; therefore, after sending the data packet, the first protocol layer may immediately set a status of the first protocol layer data packet to not pending for retransmission, for example, "locally-deleted". In future communication, however, after the first protocol layer sends the first protocol layer data packet to the second protocol layer, the second protocol layer may not immediately send the first protocol layer data packet. Therefore, if the first protocol layer sets the status of the first protocol layer data packet to not pending for retransmission immediately after sending the first protocol layer data packet to the second protocol layer, the status of the first protocol layer data packet is incorrectly set.

With regard to the foregoing problem, this application provides a counting method, where the first protocol layer data packet is set to not pending for retransmission when the first protocol layer data packet is pending for retransmission and when the second protocol layer indicates that the first protocol layer data packet has been sent, thereby avoiding incorrect setting of the status of the first protocol layer data packet and ensuring correctness of retransmission processing.

With regard to the foregoing problem, this application further provides another counting method, where when the retransmission is not retransmission for the first time and the second protocol layer indicates that the first protocol layer data packet is not pending for transmission or not being transmitted, the retransmission counter is updated or a value of the retransmission counter is kept unchanged. In the method, when the second protocol layer indicates that the first protocol layer data packet is not pending for transmission or not being transmitted, it indicates that the second protocol layer does not have the first protocol layer data packet. Therefore, the first protocol layer may transfer the first protocol layer data packet to the second protocol layer and count the retransmission. In the method, the first protocol layer may count the retransmission based on an indication from the second protocol layer, thereby avoiding incorrect setting of the status of the first protocol layer data packet and ensuring correctness of retransmission processing.

The following specifically describes the counting methods provided in this application.

Figure 1A:
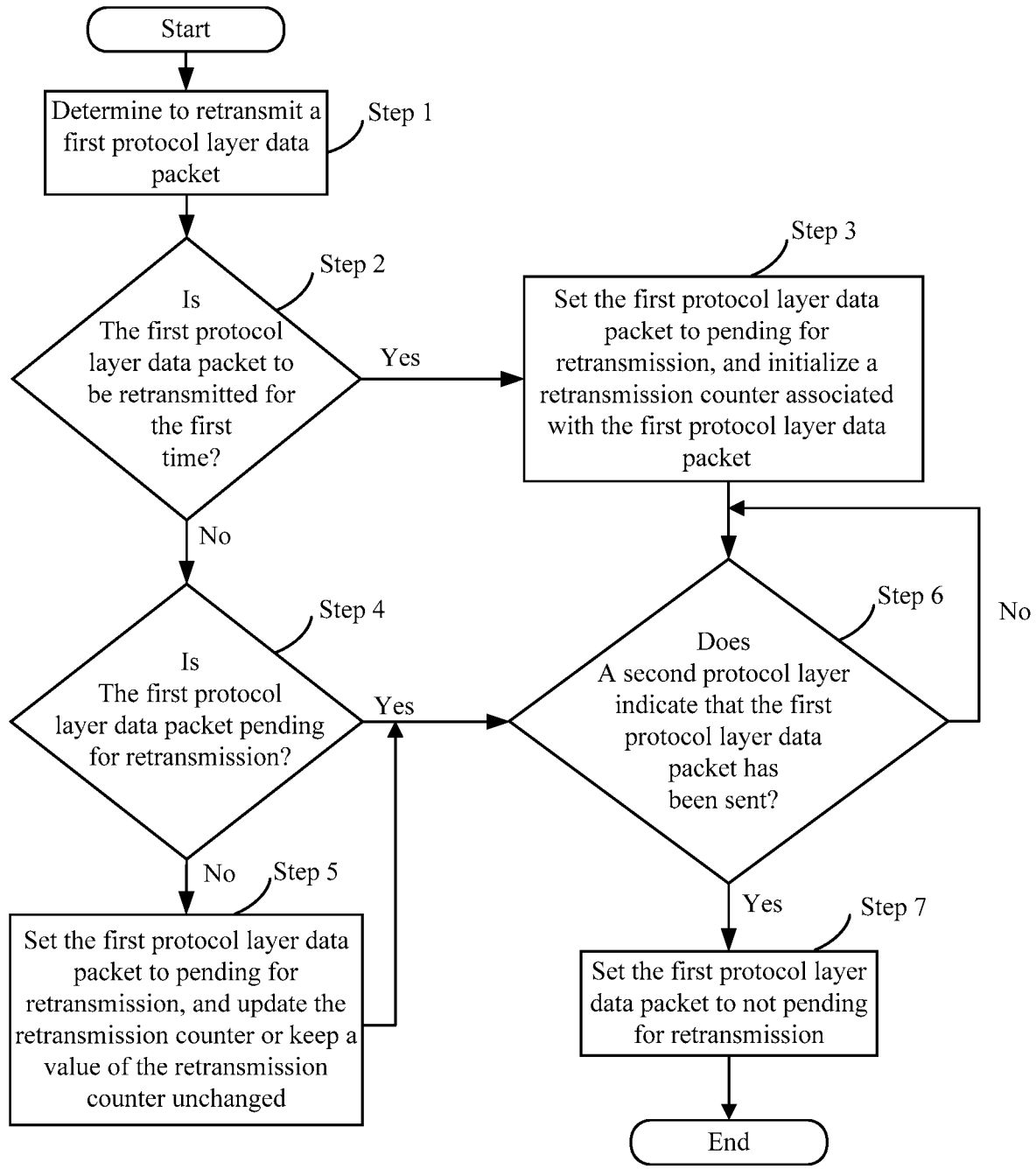
FIG. 1A is a flowchart of a counting method according to this application.

FIG. 1A shows a counting method according to this application. The method is applicable to a system architecture shown in FIG. 1, and includes the following steps.

Step 1: Determine to retransmit a first protocol layer data packet.

For example, in an implementation, it may be determined to retransmit the first protocol layer data packet when information indicating that the first protocol layer data packet fails to be transmitted is received. For example, when a status report indicating that an RLC PDU, or an RLC PDU segment, or an RLC PDU portion fails to be transmitted is received, it is determined to retransmit the RLC PDU, or the RLC PDU segment, or the RLC PDU portion.

Step 2: Determine whether the first protocol layer data packet is to be retransmitted for the first time; and if the first protocol layer data packet is to be retransmitted for the first time, perform step 3; or if the first protocol layer data packet is not to be retransmitted for the first time, perform step 4.

Step 3: Set the first protocol layer data packet to pending for retransmission, initialize a retransmission counter associated with the first protocol layer data packet, and go to step 6.

When the first protocol layer data packet is to be retransmitted for the first time, the retransmission counter associated with the first protocol layer data packet is not set. Therefore, the retransmission counter needs to be initialized. That the retransmission counter is not set means that the retransmission counter does not exist, or the retransmission counter exists but its initial value is not set.

Further, the first protocol layer data packet needs to be set to pending for retransmission. For example, an implementation is to set a first protocol layer retransmission buffer in a first protocol layer, where each data packet in the retransmission buffer is a data packet to be retransmitted. Therefore, setting the first protocol layer data packet to pending for retransmission is storing the first protocol layer data packet in the first protocol layer retransmission buffer, or may be understood as buffering the first protocol layer data packet into the first protocol layer retransmission buffer. For another example, another implementation is to establish a status table in a first protocol layer, to record a retransmission status of each first protocol layer data packet that needs to be retransmitted. For example, the status is recorded as pending for retransmission or not pending for retransmission.

To facilitate description, the following description is given by using an example in which a retransmission buffer is disposed in a first protocol layer as an example. Another implementation also falls into the protection scope of this application.

Step 4: Determine whether the first protocol layer data packet is pending for retransmission; and if the first protocol layer data packet is not pending for retransmission, perform step 5; or if the first protocol layer data packet is pending for retransmission, perform step 6.

When the first protocol layer data packet is stored in the first protocol layer retransmission buffer, the first protocol layer data packet is pending for retransmission; or when the first protocol layer data packet is not stored in the first protocol layer retransmission buffer, the first protocol layer data packet is not pending for retransmission.

Step 5: Set the first protocol layer data packet to pending for retransmission, update the retransmission counter or keep a value of the retransmission counter unchanged, and go to step 6.

In this case, the retransmission is not retransmission for the first time and the first protocol layer data packet is not pending for retransmission. In other words, the first protocol layer data packet is not stored in the first protocol layer retransmission buffer. Then the first protocol layer data packet is set to pending for retransmission. In other words, the first protocol layer data packet is stored in the first protocol layer retransmission buffer. Further, the retransmission counter needs to be updated or the value of the retransmission counter needs to be kept unchanged.

Step 6: Determine whether a second protocol layer indicates that the first protocol layer data packet has been sent; and if the second protocol layer indicates that the first protocol layer data packet has been sent, perform step 7; or if the second protocol layer does not indicate that the first protocol layer data packet has been sent, go to step 6.

Optionally, after the first protocol layer data packet is sent over an air interface, the second protocol layer indicates that the first protocol layer data packet has been sent; or, after the second protocol layer transfers the first protocol layer data packet to a physical layer, the second protocol layer indicates that the first protocol layer data packet has been sent; or after a hybrid automatic repeat request (HARQ) retransmission is performed, regardless of whether a result is a failure or a success, the second protocol layer indicates that the first protocol layer data packet has been sent. Alternatively, in another case, the second protocol layer indicates that the first protocol layer data packet has been sent.

Step 7: Set the first protocol layer data packet to not pending for retransmission.

If the first protocol layer data packet is pending for retransmission and the second protocol layer indicates that the first protocol layer data packet has been sent, the first protocol layer data packet is set to not pending for retransmission. In other words, the first protocol layer data packet is deleted from the first protocol layer retransmission buffer.

Optionally, after step 1, the method further includes: transferring the first protocol layer data packet to the second protocol layer.

In this application, after the first protocol layer sends the first protocol layer data packet to the second protocol layer, the first protocol layer data packet is set to not pending for retransmission only when information from the second protocol layer indicating that the first protocol layer data packet has been sent is received, thereby avoiding incorrect setting of the status of the first protocol layer data packet and ensuring correct processing of retransmission and correct counting of the retransmission counter. In this way, RLF can be correctly triggered, to reduce a quantity of times of unnecessary RLF triggering and reduce overheads.

Figure 1B:
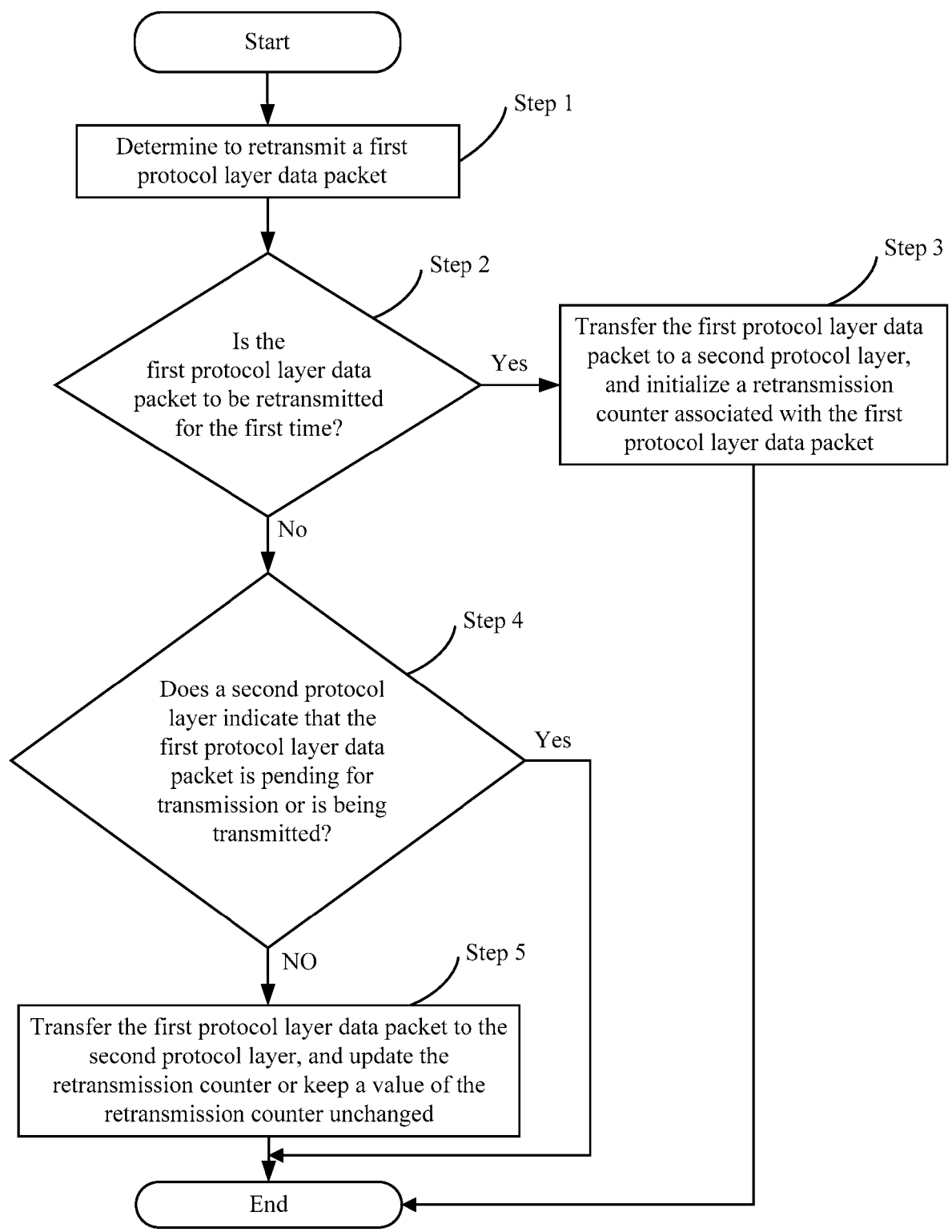
FIG. 1B is a flowchart of another counting method according to this application.

FIG. 1B shows another counting method according to this application. The method is applicable to a system architecture shown in FIG. 1, and includes the following steps.

Step 1: Determine to retransmit a first protocol layer data packet.

For example, in an implementation, it may be determined to retransmit the first protocol layer data packet when information indicating that the first protocol layer data packet fails to be transmitted is received. For example, when a status report indicating that an RLC PDU, or an RLC PDU segment, or an RLC PDU portion fails to be transmitted is received, it is determined to retransmit the RLC PDU, or the RLC PDU segment, or the RLC PDU portion.

Step 2: Determine whether the first protocol layer data packet is to be retransmitted for the first time; and if the first protocol layer data packet is to be retransmitted for the first time, perform step 3; or if the first protocol layer data packet is not to be retransmitted for the first time, perform step 4.

Step 3: Transfer the first protocol layer data packet to a second protocol layer, and initialize a retransmission counter associated with the first protocol layer data packet.

When the first protocol layer data packet is to be retransmitted for the first time, the retransmission counter associated with the first protocol layer data packet is not set. Therefore, the retransmission counter needs to be initialized. That the retransmission counter is not set means that the retransmission counter does not exist, or the retransmission counter exists but its initial value is not set. In addition, when the first protocol layer data packet is to be retransmitted for the first time, if the second protocol layer does not have a first protocol layer data packet pending for transmission or being transmitted, the first protocol layer data packet is transferred to the second protocol layer.

Step 4: Whether the second protocol layer indicates that the first protocol layer data packet is pending for transmission or being transmitted; and if the second protocol layer does not indicate that the first protocol layer data packet is pending for transmission or being transmitted, perform step 5; or if the second protocol layer indicates that the first protocol layer data packet is pending for transmission or being transmitted, end the procedure.

Step 5: Transfer the first protocol layer data packet to the second protocol layer, and update the retransmission counter or keep a value of the retransmission counter unchanged.

When the second protocol layer indicates that the first protocol layer data packet is not pending for transmission or not being transmitted, it indicates that the second protocol layer does not have a first protocol layer data packet pending for transmission or being transmitted. Therefore, a first protocol layer sends the first protocol layer data packet to the second protocol layer for retransmission. Then, further, the retransmission counter needs to be updated, or the value of the retransmission counter needs to be kept unchanged.

When the second protocol layer indicates that the first protocol layer data packet is pending for transmission or is being transmitted, it indicates that the second protocol layer is already preparing for retransmission or is already retransmitting the first protocol layer data packet. Then, the first protocol layer does not need to repeatedly send the first protocol layer data packet to the second protocol layer. Instead, the second protocol layer needs only to continue to retransmit the first protocol layer data packet. In this case, the retransmission counter does not need to be updated, either.

In the foregoing counting method provided in this application, provided that the second protocol layer indicates whether the first protocol layer data packet (namely, a data packet to be retransmitted) is already pending for retransmission or is being retransmitted, the first protocol layer can determine whether to send the first protocol layer data packet to the second protocol layer and update the retransmission counter. Compared with the method shown in FIG. 1A, in the method shown in FIG. 1B, the status (for example, pending for retransmission or not pending for retransmission) of the first protocol layer data packet does not need to be recorded in the first protocol layer. Therefore, during specific implementation, there is no need to maintain a retransmission buffer or to maintain a status table in the first protocol layer, thereby helping to save resources.

The following describes several methods for updating a retransmission counter with reference to the accompanying drawings. These methods may be applicable to the flowchart shown FIG. 1A or FIG. 1B, and specifically describe how to update the retransmission counter or keep a value of the retransmission counter unchanged.

The following description is provided by using an example in which the first protocol layer is an RLC layer, the second protocol layer is a MAC layer, the first protocol layer data packet is an RLC data packet to be retransmitted, and the first protocol layer retransmission buffer is an RLC retransmission buffer.

Solution 1: When the RLC layer performs counting on the retransmission counter, each RLC PDU, or RLC PDU segment, or RLC PDU portion put into the RLC retransmission buffer and/or transferred to the MAC layer is counted once.

Figure 2:
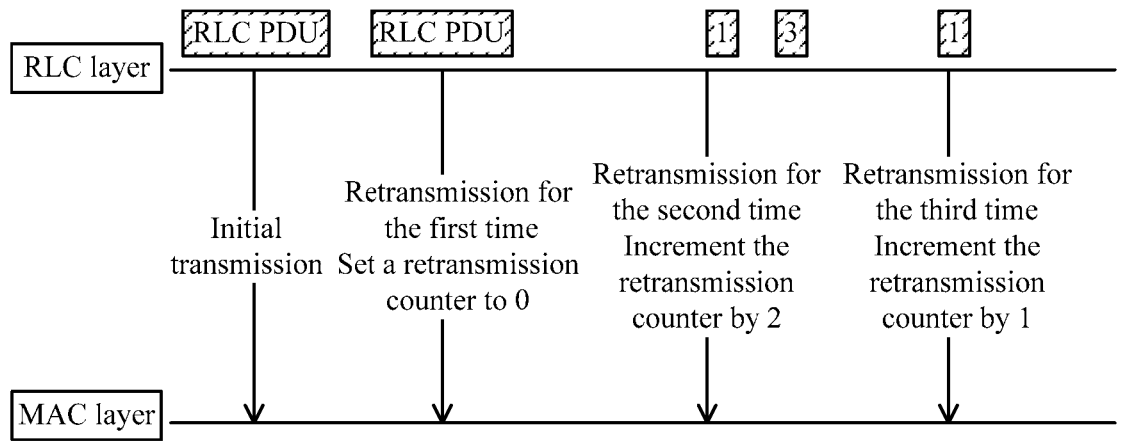
FIG. 2 is an example of updating a retransmission counter according to this application.

FIG. 2 shows an example of updating the retransmission counter. During initial transmission, the RLC layer sends an RLC PDU to the MAC layer, and an RLC status report received by the RLC layer indicates that the entire RLC PDU is lost. Then the RLC layer retransmits the RLC PDU.

In retransmission for the first time, because the entire RLC PDU is lost, the RLC layer puts the entire RLC PDU into the RLC retransmission buffer and/or transfers the entire RLC PDU to the MAC layer. At this time, the retransmission counter is initialized, for example, initialized to 0, and incremented by 1 for each time of subsequent retransmission until a preset threshold is reached, triggering radio link failure (RLF); or initialized to a value, for example, 10, and decremented by 1 for each time of subsequent retransmission until the retransmission counter is 0, triggering RLF.

When the MAC layer actually retransmits the RLC PDU, the RLC layer may be required to re-segment the RLC PDU based on a condition such as a grant size and a data packet size. However, the RLC layer does not update the retransmission counter.

In retransmission for the second time, because two non-consecutive PDU segments, a segment 1 and a segment 3, need to be retransmitted, two segments are put into the RLC retransmission buffer and/or transferred to the MAC layer. Therefore, the retransmission counter is incremented by 2.

In other words, the retransmission counter is incremented by 1 for each PDU segment that needs to be retransmitted, or it may be understood that the retransmission counter is incremented by a quantity of PDU segments that need to be retransmitted.

In retransmission for the third time, because one PDU segment, the segment 1, needs to be retransmitted, one segment is put into the RLC retransmission buffer and/or transferred to the MAC layer. Therefore, the retransmission counter is incremented by 1.

Solution 2: When the RLC layer performs counting on the retransmission counter, each segment put into the RLC retransmission buffer and/or transferred to the MAC layer is counted once. In addition, after segmentation is performed as requested by the MAC layer, the segmentation also needs to be counted.

Figure 3:
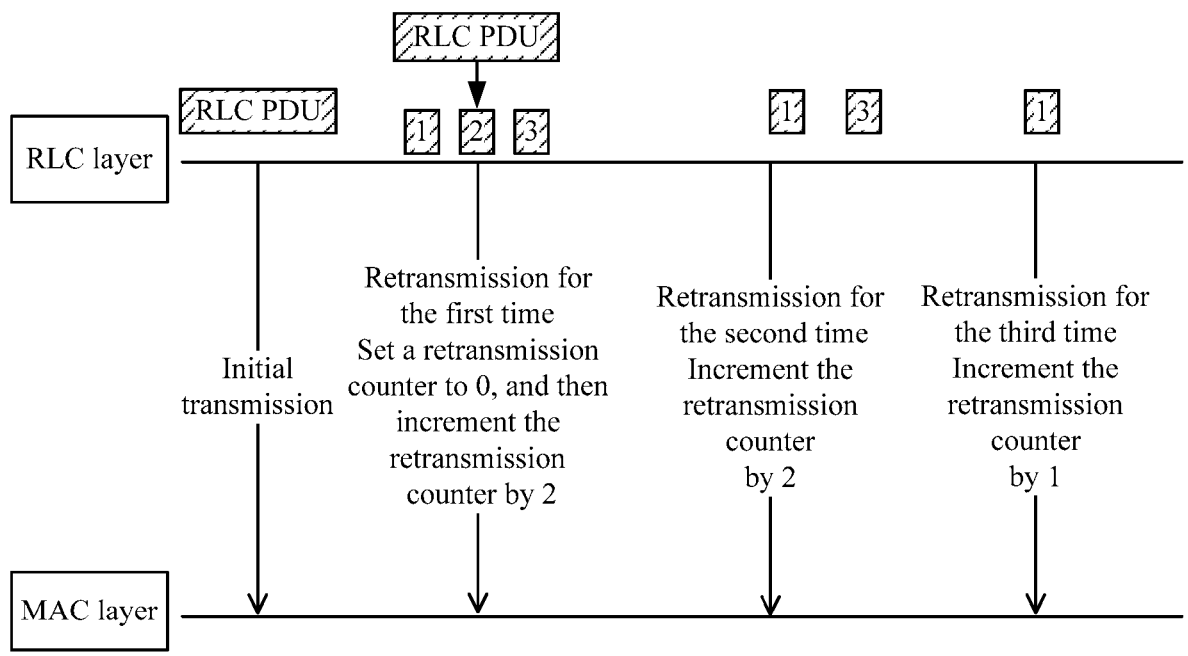
FIG. 3 is another example of updating a retransmission counter according to this application.

FIG. 3 shows another example of updating the retransmission counter. During initial transmission, the RLC layer sends an RLC PDU to the MAC layer, and an RLC status report received by the RLC layer indicates that the entire RLC PDU is lost. Then the RLC layer retransmits the RLC PDU.

In retransmission for the first time, because the entire RLC PDU is lost, the RLC layer puts the entire RLC PDU into the RLC retransmission buffer and/or transfers the entire RLC PDU to the MAC layer. At this time, the retransmission counter is initialized to 0. Then, during actual transmission, the MAC layer requests the RLC layer to segment the RLC PDU, for example, into a segment 1, a segment 2, and a segment 3. The RLC layer puts RLC PDU segments obtained after the segmentation into the RLC retransmission buffer and/or transfers them to the MAC layer. Because there is one RLC PDU before segmentation and three RLC PDU segments after the segmentation, a value increment is 2. Therefore, in the retransmission for the first time, after the segmentation is performed, the retransmission counter is initialized to 0 and then incremented by 2.

In retransmission for the second time, because two non-consecutive PDU segments, the segment 1 and the segment 3, need to be retransmitted, two segments are put into the RLC retransmission buffer and/or transferred to the MAC layer. Therefore, the retransmission counter is incremented by 2.

In the retransmission for the second time because the MAC layer does not require re-segmentation of the segment 1 and the segment 3, the retransmission counter is not further updated.

In retransmission for the third time, because one PDU segment, the segment 1, needs to be retransmitted, one segment is put into the RLC retransmission buffer and/or transferred to the MAC layer. Therefore, the retransmission counter is incremented by 1.

In the retransmission for the third time, because the MAC layer does not require re-segmentation of the segment 1, the retransmission counter is not further updated.

In the foregoing method, for each PDU or PDU segment that needs to be retransmitted, the retransmission counter is first incremented by 1. If the MAC layer instructs to segment an RLC data packet (namely, an RLC PDU, an RLC PDU segment, or an RLC PDU portion), the retransmission counter is incremented by N−1, where N is a quantity of RLC data packet segments.

Solution 3: When the RLC layer performs counting on the retransmission counter, regardless of a quantity of segments, after a first segment is counted, following segments are not counted, provided that the segments belong to a same PDU.

It may be understood that, if a PDU segment to be retransmitted is a first data packet in one retransmission of the PDU, the retransmission counter is incremented by 1; or if an RLC data packet to be retransmitted is an $M^{th}$ data packet in one retransmission of the PDU, the value of the retransmission counter is kept unchanged, where M is an integer greater than 1.

The one retransmission of the PDU means that retransmission of all PDU segments that need to be retransmitted in one PDU constitute one retransmission. For example, it is assumed that PDU segments that need to be retransmitted as reported in a status report 1 are: a PDU segment 1 of a PDU 1, a segment 3 of the PDU 1, and a segment 1 of a PDU 2; and PDU segments that need to be retransmitted as reported in a status report 2 are: a segment 2 of the PDU 1 and a segment 3 of the PDU 2. Then retransmission of three segments, namely, the PDU segment 1 of the PDU 1 and the segment 3 of the PDU 1 in the status report 1 and the PDU segment 2 of the PDU 1 in the status report 2, constitute one retransmission. When the three segments are retransmitted, only a first retransmitted segment is counted, and segments retransmitted subsequently are not counted. Likewise, retransmission of two segments, namely, the segment 1 of the PDU 2 in the status report 1 and the segment 3 of the PDU 2 in the status report 2, also constitute one retransmission. When the two segments are retransmitted, only a first retransmitted segment is counted, and a second retransmitted segment is not counted. It should be noted that each PDU corresponds to one retransmission counter. Therefore, in this example, the PDU 1 and the PDU 2 respectively correspond to one retransmission counter and respectively update or keep their respective retransmission counter.

In another implementation, whether it is one retransmission of the PDU may alternatively be determined based on whether a repeated segment appears. For example, it is assumed that PDU segments that need to be retransmitted as reported in a status report 1 are: a PDU segment 1 of a PDU 1, a segment 3 of the PDU 1, and a segment 1 of a PDU 2; and PDU segments that need to be retransmitted as reported in a status report 2 are: a segment 1 of the PDU 1 and a segment 3 of the PDU 2. Then the PDU segment 1 of the PDU 1 and the segment 3 of the PDU 1 in the status report 1 constitute one retransmission of the PDU 1. Because the PDU segment 1 in the status report 2 and the PDU segment 1 of the PDU 1 in the status report 1 are repeated, the PDU segment 1 of the PDU 1 in the status report 2 and the PDU segment 1 of the PDU 1 and the segment 3 of the PDU 1 in the status report 1 do not belong to one retransmission. Therefore, the PDU segment 1 of the PDU 1 in the status report 2 needs to be counted.

In another implementation, whether it is one retransmission of the PDU may alternatively be determined based on whether a partially repeated segment appears. For example, it is assumed that PDU segments that need to be retransmitted as reported in a status report 1 are: a PDU segment 1 of a PDU 1, a segment 3 of the PDU 1, and a segment 1 of a PDU 2; and PDU segments that need to be retransmitted as reported in a status report 2 are: a segment 1-1 of the segment 1 of the PDU 1 and a segment 3 of the PDU 2. The segment 1-1 of the segment 1 of the PDU 1 is a first segment of the segment 1 of the PDU 1 after the segment 1 is re-segmented, namely, a portion of the segment 1 of the PDU 1. Then the PDU segment 1 of the PDU 1 and the segment 3 of the PDU 1 in the status report 1 constitute one retransmission of the PDU 1. Because the segment 1-1 of the PDU segment 1 of the PDU 1 in the status report 2 and the PDU segment 1 of the PDU 1 in the status report 1 are partially repeated, the segment 1-1 of the PDU segment 1 of the PDU 1 in the status report 2 and the DPU segment 1 of the PDU 1 and the segment 3 of the PDU 1 in the status report 1 do not belong to one retransmission. Therefore, the segment 1-1 of the PDU segment 1 of the PDU 1 in the status report 2 needs to be counted.

Figure 4:
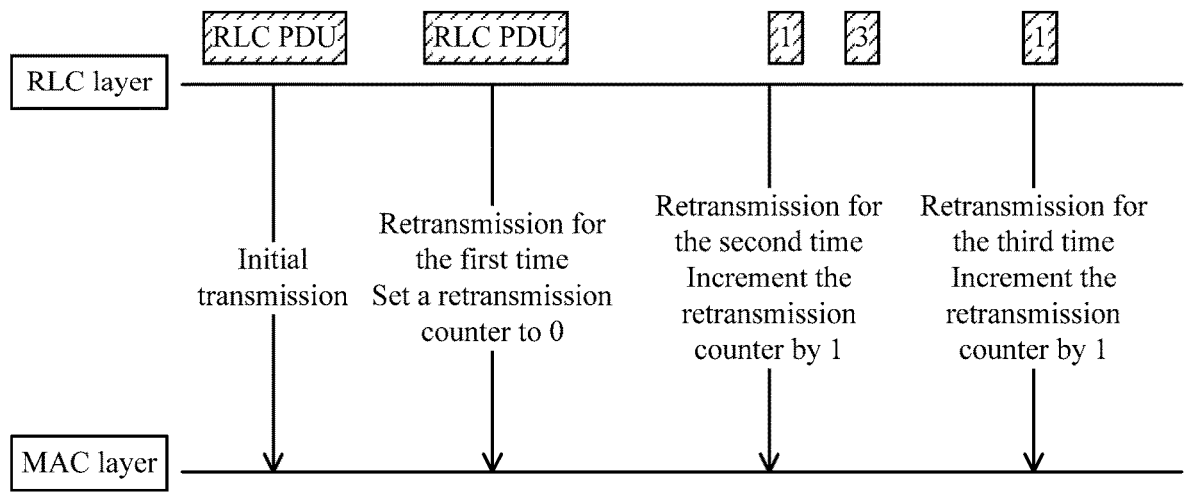
FIG. 4 is another example of updating a retransmission counter according to this application.

FIG. 4 shows another example of updating the retransmission counter. During initial transmission, the RLC layer sends an RLC PDU to the MAC layer, and an RLC status report received by the RLC layer indicates that the entire RLC PDU is lost. Then the RLC layer retransmits the RLC PDU.

In retransmission for the first time, because the entire RLC PDU is lost, the RLC layer puts the entire RLC PDU into the RLC retransmission buffer and/or transfers the entire RLC PDU to the MAC layer. At this time, the retransmission counter is initialized to 0. In retransmission for the second time, because two nonconsecutive PDU segments, a segment 1 and a segment 3, need to be retransmitted, two segments are put into the RLC retransmission buffer and/or transferred to the MAC layer. The retransmission counter is incremented by 1 only for the first PDU segment (namely, the PDU segment 1) and is kept unchanged for the second PDU segment (namely, the PDU segment 3). In retransmission for the third time, because one PDU segment, the segment 1, needs to be retransmitted, one segment is put into the RLC retransmission buffer and/or transferred to the MAC layer, and the retransmission counter is incremented by 1.

Solution 4: When the RLC layer performs counting on the retransmission counter, regardless of a quantity of segments, the segments are counted only once until a next status report, provided that the segments belong to a same PDU and are in a same status report.

It may also be understood that, if an RLC data packet to be retransmitted is a first data packet in a same PDU in a status report, the retransmission counter is incremented by 1; or if the RLC data packet to be retransmitted is an $L^{th}$ data packet in a same PDU in a status report, a value of the retransmission counter is kept unchanged, where L is an integer greater than 1.

For example, it is assumed that PDU segments that need to be retransmitted as reported in a status report 1 are: a PDU segment 1 of a PDU 1, a segment 3 of the PDU 1, a segment 5 of the PDU 1, a segment 1 of a PDU 2, and a segment 3 of the PDU 2; and PDU segments that need to be retransmitted as reported in a status report 2 are: a segment 6 of the PDU 1, a segment 8 of the PDU 1, a segment 4 of the PDU 2, and a segment 6 of the PDU 2. For the status report 1, segments belonging to the PDU 1 are the PDU segment 1 of the PDU 1, the segment 3 of the PDU 1, and the segment 5 of the PDU 1. The PDU segment 1 of the PDU 1 triggers incrementing of the retransmission counter by 1, and the segment 3 of the PDU 1 and the segment 5 of the PDU 1 make the retransmission counter keep unchanged. Segments belonging to the PDU 2 are the segment 1 of the PDU 2 and the segment 3 of the PDU 2. The PDU segment 1 of the PDU 2 triggers incrementing of the retransmission counter by 1, and the segment 3 of the PDU 2 makes the retransmission counter keep unchanged. Likewise, for the status report 2, segments belonging to the PDU 1 are the PDU segment 6 of the PDU 1 and the segment 8 of the PDU 1. The PDU segment 6 of the PDU 1 triggers incrementing of the retransmission counter by 1, and the segment 8 of the PDU 1 makes the retransmission counter keep unchanged. Segments belonging to the PDU 2 are the segment 4 of the PDU 2 and the segment 6 of the PDU 2. The PDU segment 4 of the PDU 2 triggers incrementing of the retransmission counter by 1, and the segment 6 of the PDU 2 makes the retransmission counter keep unchanged.

It should be noted that the foregoing solution is only an example. Whether to update the retransmission counter may not be determined based on whether a data packet is the first data packet in a same status report. Alternatively, whether to increment the retransmission counter by 1 may be determined based on whether there is at least one data packet of a PDU in a status report. For example, when it is determined that there is at least one data packet of a PDU in a status report, the retransmission counter is incremented by 1; when it is determined that there is not at least one data packet of a PDU in a status report, a value of the retransmission counter is kept unchanged.

Solution 5: When the RLC layer transfers to-be-retransmitted PDUs or PDU segments to the MAC layer, the RLC layer does not perform counting, but notifies the MAC layer that the PDUs or PDU segments are to-be-retransmitted PDUs or PDU segments. When transferring the PDUs or PDU segments to a physical layer, the MAC layer notifies the RLC layer that which PDUs or PDU segments have been put into a same transport block or MAC PDU. In addition, when the PDUs or PDU segments that belong to a same PDU are put into the same transport block or MAC PDU, a corresponding retransmission counter is incremented by 1.

The foregoing method may also be understood as that, if an RLC data packet to be retransmitted is a first data packet in a PDU in a transport block, the retransmission counter is incremented by 1; or if an RLC data packet to be retransmitted is a $K^{th}$ data packet in a PDU in a transport block, a value of the retransmission counter is kept unchanged, where K is an integer greater than 1.

Solution 6: Indication information is received; and the retransmission counter is updated or a value of the retransmission counter is kept unchanged based on the indication information.

A specific manner for updating the retransmission counter or keeping the value of the retransmission counter unchanged may be one of the solution 1 to the solution 5. In other words, in the solution 6, a manner of updating the retransmission counter is selected based on the indication information.

For example, when the foregoing counting method is performed by a terminal, the terminal may receive indication information from a base station and select, based on the indication information from the base station, a counting manner to update the retransmission counter.

The foregoing provides several manners of updating or keeping the retransmission counter. In actual application, one or more of the manners may be selected for use based on a requirement. For example, different counting manners may be selected for different PDUs, and different counting manners may be selected for different logical channels. A specific counting manner may be preset, or may be notified by a base station to a terminal by sending information.

After being retransmitted by the RLC layer, if some PDU segments are successfully retransmitted and some PDU segments still fail to be retransmitted, in a counting method of LTE, the retransmission counter continues to be cumulatively incremented. In other words, provided that there is still a retransmission failure of a to-be-retransmitted PDU segment, the retransmission counter keeps being cumulatively incremented until a maximum quantity of retransmission times is exceeded, triggering a radio link failure (RLF). However, there is a relatively severe problem in that counting method. For example, when channel quality temporarily deteriorates and therefore there are many PDU segments, a quantity of times of PDU segment retransmission failures increases. As a result, the retransmission counter very easily reaches the maximum quantity of retransmission times, triggering an RLF. Given this, this application provides a method for resetting the retransmission counter. In any one of the counting method 1 to the counting method 6, if an RLC data packet to be retransmitted is successfully retransmitted, the retransmission counter is reset. In other words, provided that one RLC data packet (an RLC PDU, or an RLC PDU segment, or an RLC PDU portion) is successfully retransmitted, resetting the retransmission counter is triggered, thereby greatly reducing a case in which the retransmission counter reaches the maximum quantity of retransmission times and optimizing system performance.

Figure 5:
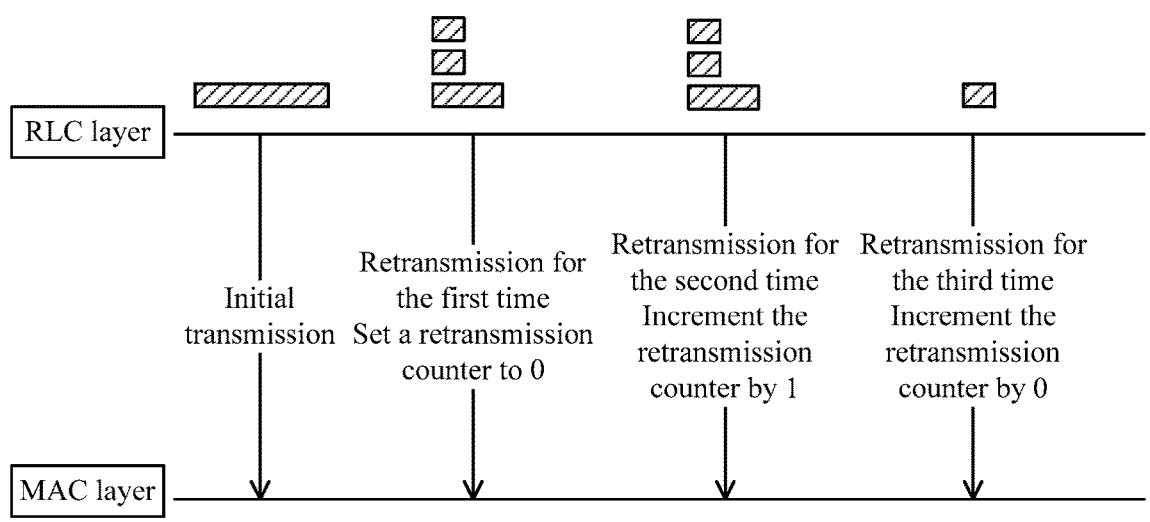
FIG. 5 is an example diagram of resetting a retransmission counter according to this application.

FIG. 5 is an example diagram of resetting the retransmission counter according to this application. In retransmission for the third time, it is found that a to-be-retransmitted PDU segment has been successfully retransmitted. Therefore, the retransmission counter is reset.

Figure 6:
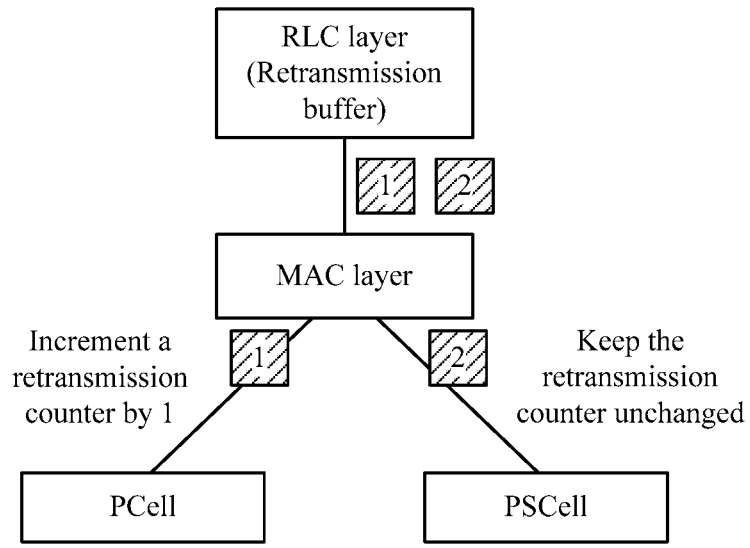
FIG. 6 is an example diagram of updating a retransmission counter according to this application.

Currently, in LTE, when a retransmission counter is used, whether retransmission occurs in a primary cell (PCell) or occurs in a primary secondary cell (PSCell) is not considered. To be specific, regardless of whether a PDU or PDU segment needs to be retransmitted in a primary cell or a PDU or PDU segment needs to be retransmitted in a secondary cell, an operation such as updating, keeping, or resetting the retransmission counter is triggered. However, in actual application, considering that an RLF is only for a primary cell and it does not matter even if the primary secondary cell is damaged, this application further provides a method for processing the retransmission counter. The processing method is applicable to the counting method 1 to the counting method 6. A MAC layer notifies an RLC layer of whether a transport block is transmitted in a PCell or in a PSCell. The RLC layer performs counting on the retransmission counter only when the transport block is transmitted in the PCell. For example, FIG. 6 is an example diagram of updating the retransmission counter according to this application. The retransmission counter is updated only when PDU segment retransmission occurs in a PCell.

Figure 7:
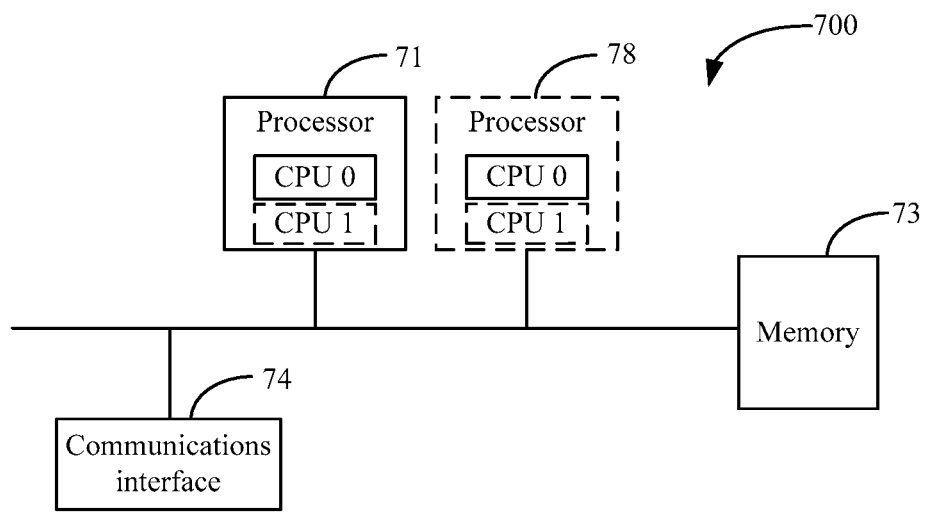
FIG. 7 is a schematic diagram of a communications apparatus according to this application.

FIG. 7 is a schematic diagram of a communications apparatus according to this application. The communications apparatus 700 may be a terminal or a base station shown in FIG. 1, or a chip in a terminal or a chip in a base station, or a CU or a chip in a CU, or a DU or a chip in a DU. The communications apparatus may be configured to perform the method shown in FIG. 1A or FIG. 1B and perform any one of the counting methods in the foregoing embodiments. The communications apparatus 700 includes at least one processor 71 and at least one communications interface 74 and, optionally, further includes a memory 73.

The processor 71 may be a general purpose central processing unit (CPU), a microprocessor, an application-specific integrated circuit (ASIC), or one or more integrated circuits configured to control program execution of the solutions of the present invention.

The memory 73 may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), or magnetic disk storage medium or another magnetic storage device, or any other medium that can carry or store expected program code having an instruction or a data structure form and that can be accessed by a computer; but is not limited herein. The memory may exist independently, and is connected to the processor by using a bus. Alternatively, the memory may be integrated with the processor.

The memory 73 is configured to store application program code used to execute the solutions of the present invention, and the execution is controlled by the processor 71. The processor 71 is configured to execute the application program code stored in the memory 73.

During specific implementation, in an embodiment, the processor 71 may include one or more CPUs, for example, a CPU 0 and a CPU 1 in FIG. 7.

During specific implementation, in an embodiment, the communications apparatus 700 may include a plurality of processors, for example, the processor 71 and a processor 78 in FIG. 7. Each of these processors may be a single-CPU (single-CPU) processor, or may be a multi-CPU (multi-CPU) processor. The processor herein may be one or more devices, circuits, and/or processing cores that are configured to process data (for example, a computer program instruction).

For example, the terminal in FIG. 1 may be the communications apparatus shown in FIG. 7. One or more software modules are stored in the memory of the communications apparatus. The communications apparatus may implement the software modules by using the processor and the program code in the memory, to implement functions of a communications apparatus in any embodiment of this application.

The retransmission buffer used in the counting method in this application may be implemented by the memory 73 in FIG. 7, or may be implemented by a memory in the processor 71 (and/or the processor 78), and is not limited in this application.

Division of function modules may be performed on the communications apparatus according to the foregoing method examples in this application. For example, the function modules may be divided to correspond to the functions, or two or more functions may be integrated into a processing module. The integrated module may be implemented in a form of hardware, or may be implemented in a form of a software functional module. It should be noted that, in this application, module division is exemplary, and is merely a logical function division. In actual implementation, there may be another division manner.

Figure 8:
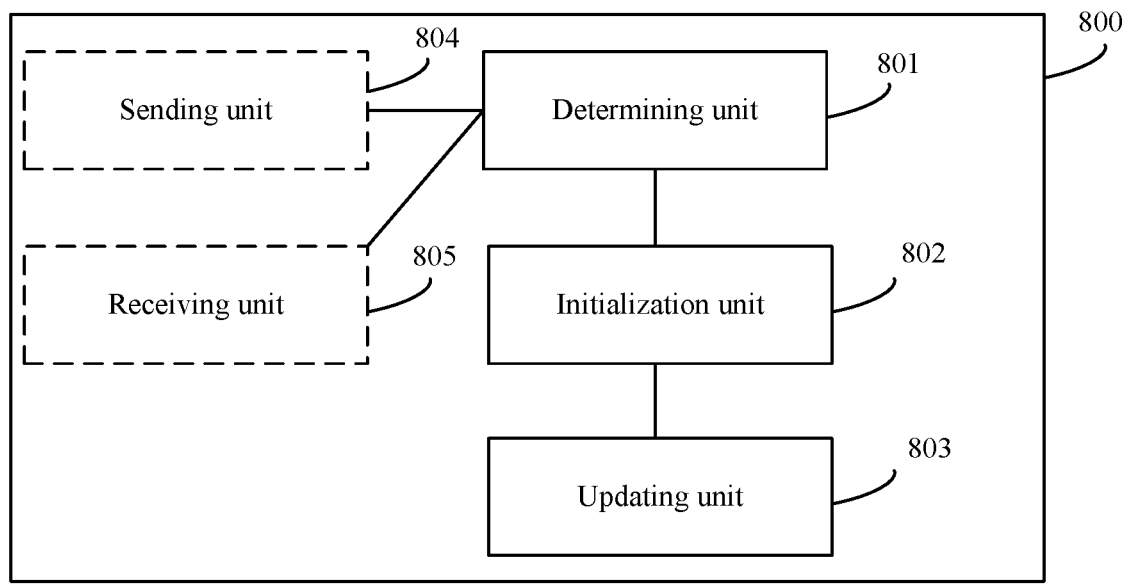
FIG. 8 is a schematic diagram of another communications apparatus according to this application.

For example, when the function modules are divided to correspond to the functions, FIG. 8 is a schematic diagram of a possible structure of a communications apparatus for implementing counting in the foregoing embodiments. The apparatus 800 includes a determining unit 801, an initialization unit 802, and an updating unit 803 and, optionally, further includes a sending unit 804 and a receiving unit 805.

The determining unit 801 is configured to determine to retransmit a first protocol layer data packet.

The initialization unit 802 is configured to: if the retransmission is retransmission for the first time, set the first protocol layer data packet to pending for retransmission and initialize a retransmission counter associated with the first protocol layer data packet.

The updating unit 803 is configured to: if the retransmission is not retransmission for the first time and the first protocol layer data packet is not pending for retransmission, set the first protocol layer data packet to pending for retransmission, and update the retransmission counter or keep a value of the retransmission counter unchanged.

The updating unit 803 is further configured to: if the first protocol layer data packet is pending for retransmission and a second protocol layer indicates that the first protocol layer data packet has been sent, set the first protocol layer data packet to not pending for retransmission.

Optionally, the updating unit 803 is specifically configured to store the first protocol layer data packet in a first protocol layer retransmission buffer;

that the first protocol layer data packet is not pending for retransmission is: the first protocol layer data packet is not stored in the first protocol layer retransmission buffer;

the updating unit 803 is specifically configured to: delete the first protocol layer data packet from the first protocol layer retransmission buffer; and that the first protocol layer data packet is pending for retransmission is: the first protocol layer data packet is stored in the first protocol layer retransmission buffer.

Optionally, the indicating, by a second protocol layer, that the first protocol layer data packet has been sent is:

after the first protocol layer data packet is sent over an air interface, indicating, by the second protocol layer, that the first protocol layer data packet has been sent; or after the second protocol layer transfers the first protocol layer data packet to a physical layer, indicating, by the second protocol layer, that the first protocol layer data packet has been sent; or after retransmission is performed by using a hybrid automatic repeat request HARQ, indicating, by the second protocol layer, that the first protocol layer data packet has been sent.

Optionally, the receiving unit 805 is configured to: receive information indicating that the first protocol layer data packet fails to be transmitted.

Optionally, the sending unit 804 is configured to: transfer the first protocol layer data packet to the second protocol layer.

Optionally, the updating unit 803 is specifically configured to: increment the retransmission counter by 1.

Optionally, the updating unit 803 is specifically configured to: increment the retransmission counter by 1; and if the second protocol layer instructs to re-segment the first protocol layer data packet, increment the retransmission counter by N−1, where N is a quantity of segments of the first protocol layer data packet obtained after the re-segmentation.

Optionally, the first protocol layer data packet is a segment of a radio link control RLC protocol data unit PDU; and the updating unit 803 is specifically configured to: if the first protocol layer data packet is the first data packet in one retransmission of the PDU, increment the retransmission counter by 1; or if the first protocol layer data packet is an $M^{th}$ data packet in one retransmission of the PDU, keep the value of the retransmission counter unchanged, where M is an integer greater than 1.

Optionally, the first protocol layer data packet is a segment of an RLC PDU; and the updating unit 803 is specifically configured to:

if the first protocol layer data packet is the first data packet of the PDU in a status report, increment the retransmission counter by 1; or if the first protocol layer data packet is an $L^{th}$ data packet of the PDU in a status report, keep the value of the retransmission counter unchanged, where L is an integer greater than 1.

Optionally, the updating unit 803 is specifically configured to:

if the first protocol layer data packet is the first data packet in a transport block, increment the retransmission counter by 1; or if the first protocol layer data packet is a $K^{th}$ data packet in a transport block, keep the value of the retransmission counter unchanged, where K is an integer greater than 1.

Optionally, the receiving unit 805 is configured to receive indication information; and the updating unit 803 is specifically configured to: update the retransmission counter or keep the value of the retransmission counter unchanged based on the indication information.

Optionally, the updating unit 803 is further configured to: if the first protocol layer data packet is successfully retransmitted, reset the retransmission counter.

Optionally, the first protocol layer data packet is retransmitted in a primary cell.

Optionally, in another implementation, the communications apparatus 800 includes a first protocol layer processing unit and a second protocol layer processing unit. The first protocol layer processing unit is configured to implement functions of the determining unit 801, the initialization unit 802, the updating unit 803, the sending unit 804, and the receiving unit 805. The second protocol layer processing unit is configured to indicate, to the first protocol layer processing unit, that the first protocol layer data packet has been sent. A specific implementation may be determined based on an actual requirement.

The communications apparatus may be a communications apparatus in any one of the foregoing method embodiments. For all related content of each step in the foregoing method embodiments, refer to function description of a corresponding function module. Details are not described herein again.

Figure 9:
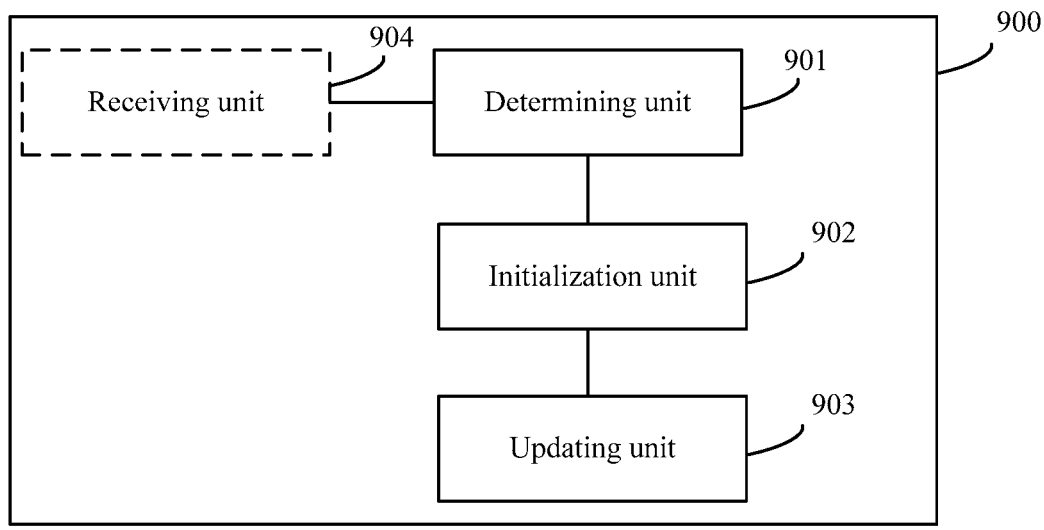
FIG. 9 is a schematic diagram of another communications apparatus according to this application.

For example, when the function modules are divided to correspond to the functions, FIG. 9 is a schematic diagram of a possible structure of a communications apparatus for implementing counting in the foregoing embodiments. The apparatus 900 includes a determining unit 901, an initialization unit 902, and an updating unit 903 and, optionally, further includes a receiving unit 904.

The determining unit 901 is configured to determine to retransmit a first protocol layer data packet.

The initialization unit 902 is configured to: if the retransmission is retransmission for the first time, initialize a retransmission counter associated with the first protocol layer data packet.

The updating unit 903 is configured to: if the retransmission is not retransmission for the first time and a second protocol layer indicates that the first protocol layer data packet is not pending for transmission or not being transmitted, update the retransmission counter or keep a value of the retransmission counter unchanged.

Optionally, the updating unit 903 is specifically configured to:

increment the retransmission counter by 1.

Optionally, the updating unit 903 is specifically configured to:

increment the retransmission counter by 1; and if the second protocol layer instructs to re-segment the first protocol layer data packet, increment the retransmission counter by N−1, where N is a quantity of segments of the first protocol layer data packet obtained after the re-segmentation.

Optionally, the first protocol layer data packet is a segment of a radio link control RLC protocol data unit PDU; and the updating unit 903 is specifically configured to:

if the first protocol layer data packet is the first data packet in one retransmission of the PDU, increment the retransmission counter by 1; or if the first protocol layer data packet is an $M^{th}$ data packet in one retransmission of the PDU, keep the value of the retransmission counter unchanged, where M is an integer greater than 1.

Optionally, the first protocol layer data packet is a segment of an RLC PDU; and the updating unit 903 is specifically configured to:

if the first protocol layer data packet is the first data packet of the PDU in a status report, increment the retransmission counter by 1; or if the first protocol layer data packet is an $L^{th}$ data packet of the PDU in a status report, keep the value of the retransmission counter unchanged, where L is an integer greater than 1.

Optionally, the updating unit 903 is specifically configured to:

if the first protocol layer data packet is the first data packet in a transport block, increment the retransmission counter by 1; or if the first protocol layer data packet is a $K^{th}$ data packet in a transport block, keep the value of the retransmission counter unchanged, where K is an integer greater than 1.

Optionally, the receiving unit 904 is configured to receive indication information; and the updating unit is specifically configured to: update the retransmission counter or keep the value of the retransmission counter unchanged based on the indication information.

Optionally, the updating unit 903 is further configured to:

if the first protocol layer data packet is successfully retransmitted, reset the retransmission counter.

Optionally, the first protocol layer data packet is retransmitted in a primary cell.

Optionally, in another implementation, the communications apparatus 900 includes a first protocol layer processing unit and a second protocol layer processing unit.

The first protocol layer processing unit is configured to implement functions of the determining unit 901, the initialization unit 902, the updating unit 903, and the receiving unit 904. The second protocol layer processing unit is configured to, indicate, to the first protocol layer processing unit, that the first protocol layer data packet is not pending for transmission or not being transmitted. A specific implementation may be determined based on an actual requirement.

The communications apparatus may be a communications apparatus in any one of the foregoing method embodiments. For all related content of each step in the foregoing method embodiments, refer to function description of a corresponding function module. Details are not described herein again.

In this embodiment, the communications apparatus is presented in a form of dividing various function modules to correspond to various functions, or the communications apparatus is presented in a form of dividing various function modules in an integrated manner. The "module" herein may be an application-specific integrated circuit (ASIC), a circuit, a processor and a memory that are configured to execute one or more software or firmware programs, an integrated logic circuit, and/or another component capable of providing the foregoing functions. In a simple embodiment, a person skilled in the art may come up with an idea that the communications apparatus 800 may use a form shown in FIG. 7. For example, the determining unit 801, the initialization unit 802, the updating unit 803, the sending unit 804, and the receiving unit 805 in FIG. 8 may be implemented by using the processor 71 (and/or the processor 78) and the memory 73 in FIG. 7. Specifically, the determining unit 801, the initialization unit 802, the updating unit 803, the sending unit 804, and the receiving unit 805 may be executed by invoking, by the processor 71 (and/or the processor 78), application program code stored in the memory 73, and this application does not impose any limitation thereto. For example, the determining unit 901, the initialization unit 902, the updating unit 903, and the receiving unit 904 in FIG. 9 may be implemented by the processor 71 (and/or the processor 78) and the memory 73 in FIG. 7. Specifically, the determining unit 901, the initialization unit 902, the updating unit 903, and the receiving unit 904 may be executed by invoking, by the processor 71 (and/or the processor 78), application program code stored in the memory 73, and this application does not impose any limitation thereto.

This application further provides a computer storage medium, configured to store a computer software instruction to be used by the foregoing communications apparatus shown in FIG. 7 to FIG. 9, including program code designed to execute the foregoing method embodiments.

This application further provides a computer program product. The computer program product includes a computer software instruction. The computer software instruction may be loaded by using a processor to implement the methods in the foregoing method embodiments.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "including" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Furthermore, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided together with another piece of hardware or used as a part of hardware, or may also use another distribution form, for example, by using the Internet or another wired or wireless telecommunications system.

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a special purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, apparently, various modifications and combinations may be made to the present invention without departing from the spirit and scope of the present invention. Correspondingly, this specification and accompanying drawings are merely exemplary description of the present invention defined by the accompanying claims, and is considered as any or all modifications, variations, combinations or equivalents that cover the scope of the present invention. Apparently, a person skilled in the art may make various modifications and variations to the present invention without departing from the spirit and scope of the present invention. The present invention is intended to cover these modifications and variations provided that they fall within the scope of protection defined by the following claims and their equivalent technologies.

What is claimed is:

1. A counting method, comprising:
   receiving a status report, wherein the status report indicates that a first data packet in a first protocol layer fails to be transmitted;
   determining, based on the status report, to retransmit the first data packet;
   updating a retransmission counter associated with the first data packet or keeping a value of the retransmission counter associated with the first data packet unchanged in response to retransmission of the first data packet not being a retransmission for a first time and the first data packet not pending for retransmission; and
      in response to the retransmission counter associated with the first data packet not being updated due to an indication of the status report that another data packet in the first protocol layer fails to be transmitted, updating the retransmission counter associated with the first data packet; or
      in response to the retransmission counter associated with the first data packet being updated due to the indication of the status report that another data packet in the first protocol layer fails to be transmitted, keeping the value of the retransmission counter associated with the first data packet unchanged.

2. The method according to claim 1, wherein the retransmission counter associated with the first data packet is updated only once in response to the status report further indicating that another data packet in the first protocol layer associated with the retransmission counter associated with the first data packet fails to be transmitted.

3. The method according to claim 1, wherein the updating the retransmission counter associated with the first data packet comprises:
   incrementing the retransmission counter associated with the first data packet by 1.

4. The method according to claim 1, wherein the first protocol layer is a radio link control (RLC) layer.

5. The method according to claim 1,
   wherein the first data packet is not pending for retransmission in response to the first protocol layer data packet not being stored in a retransmission buffer of the first protocol layer.

6. The method according to claim 1, further comprising:
   setting the first data packet to not pending for retransmission in response to the first data packet pending for retransmission and a second protocol layer indicating that the first data packet has been sent.

7. The method according to claim 6,
   wherein the setting the first data packet to not pending for retransmission comprises: deleting the first data packet from a retransmission buffer of the first protocol layer.

8. The method according to claim 6, wherein the indicating, by the second protocol layer, that the first data packet has been sent comprises:
   after the first data packet is sent over an air interface, indicating, by the second protocol layer, that the first data packet has been sent; or
   after the second protocol layer transfers the first data packet to a physical layer, indicating, by the second protocol layer, that the first data packet has been sent; or
   after hybrid automatic repeat request (HARQ) retransmission of the first data packet, indicating, by the second protocol layer, that the first data packet has been sent.

9. The method according to claim 1, further comprising:
   transferring the first data packet to a second protocol layer.

10. The method according to claim 1, further comprising:
    resetting the retransmission counter in response to the first data packet being successfully retransmitted.

11. The method according to claim 1, wherein in response to the status report indicating that a second data packet in the first protocol layer fails to be transmitted, and retransmission of the second data packet is in retransmission for a first time, the method further comprises:
    initializing a retransmission counter associated with the second data packet.

12. The method according to claim 11, wherein the initializing the retransmission counter associated with the second data packet comprises:
    initializing the retransmission counter associated with the second data packet to 0.

13. A communications apparatus, comprising a processor, wherein the processor is connected with a memory and configured to execute a program stored in the memory, and when the program is executed by the processor, the apparatus is configured for:

receiving a status report, wherein the status report indicates that a first data packet in a first protocol layer fails to be transmitted;

determining, based on the status report, to retransmit the first data packet;

updating a retransmission counter associated with the first data packet or keeping a value of the retransmission counter associated with the first data packet unchanged in response to retransmission of the first data packet not being a retransmission for a first time and the first data packet not pending for retransmission; and in response to the retransmission counter associated with the first data packet not being updated due to an indication of the status report that another data packet in the first protocol layer fails to be transmitted, updating the retransmission counter associated with the first data packet; or in response to the retransmission counter associated with the first data packet being updated due to the indication of the status report that another data packet in the first protocol layer fails to be transmitted, keeping the value of the retransmission counter associated with the first data packet unchanged.

14. The apparatus according to claim 13, wherein the retransmission counter associated with the first data packet is updated only once in response to the status report further indicating that another data packet in the first protocol layer associated with the retransmission counter associated with the first data packet fails to be transmitted.

15. The apparatus according to claim 13, wherein the program, when executed by the processor, further configures the apparatus for:

incrementing the retransmission counter associated with the first data packet by 1.

16. The apparatus according to claim 13, wherein the first protocol layer is a radio link control (RLC) layer.

17. The apparatus according to claim 13, wherein the first data packet not stored in a retransmission buffer of the first protocol layer is not pending for retransmission.

18. The apparatus according to claim 13, wherein the program, when executed by the processor, further configures the apparatus for:

transferring the first data packet to a second protocol layer.

19. The apparatus according to claim 13, wherein the program, when executed by the processor, further configures the apparatus for:

resetting, in response to the first data packet being successfully retransmitted, the retransmission counter.

20. The apparatus according to claim 13, wherein in response to the status report indicating that a second data packet in the first protocol layer fails to be transmitted, and retransmission of the second data packet is in retransmission for a first time, the program, when executed by the processor, further configures the apparatus for:

initializing a retransmission counter associated with the second data packet.

21. The apparatus according to claim 20, wherein the program, when executed by the processor, configures the apparatus for:

initializing the retransmission counter associated with the second data packet to 0.

22. The apparatus according to claim 13, wherein the program, when executed by the processor, configures the apparatus for:

setting the first data packet to not pending for retransmission in response to the first data packet pending for retransmission and a second protocol layer indicating that the first data packet has been sent.

23. The apparatus according to claim 22, wherein the setting the first data packet to not pending for retransmission comprises:

deleting the first data packet from a retransmission buffer of the first protocol layer.

24. The apparatus according to claim 22, wherein the indicating that the first data packet has been sent comprises:

after the first data packet is sent over an air interface, indicating, by the second protocol layer, that the first data packet has been sent; or after the second protocol layer transfers the first data packet to a physical layer, indicating, by the second protocol layer, that the first data packet has been sent; or after hybrid automatic repeat request (HARQ) retransmission of the first data packet, indicating, by the second protocol layer, that the first data packet has been sent.

25. A non-transitory computer-readable storage medium, comprising a program, wherein when the program is executed by a processor, the processor is configured to perform steps comprising:

receiving a status report, wherein the status report indicates that a first data packet in a first protocol layer fails to be transmitted;

determining, based on the status report, to retransmit the first data packet;

updating a retransmission counter associated with the first data packet or keeping a value of the retransmission counter associated with the first data packet unchanged in response to retransmission of the first data packet not being a retransmission for a first time and the first data packet not pending for retransmission; and in response to the retransmission counter associated with the first data packet not being updated due to an indication of the status report that another data packet in the first protocol layer fails to be transmitted, updating the retransmission counter associated with the first data packet; or in response to the retransmission counter associated with the first data packet being updated due to the indication of the status report that another data packet in the first protocol layer fails to be transmitted, keeping the value of the retransmission counter associated with the first data packet unchanged.

26. The non-transitory computer-readable storage medium according to claim 25, wherein in response to the status report further indicating that another data packet in the first protocol layer associated with the retransmission counter associated with the first data packet fails to be transmitted, the retransmission counter associated with the first data packet is updated only once.

27. The non-transitory computer-readable storage medium according to claim 25, wherein in response to the status report indicating that a second data packet in the first protocol layer fails to be transmitted, and in response to retransmission of the second data packet being a retransmission for a first time, the processor is further configured to perform steps comprising:

initializing a retransmission counter associated with the second data packet.

28. The non-transitory computer-readable storage medium according to claim 27, wherein the processor is configured to perform steps comprising:

initializing the retransmission counter associated with the second data packet to 0.

29. The non-transitory computer-readable storage medium according to claim 25, wherein the updating the retransmission counter associated with the first data packet comprises:
 incrementing the retransmission counter associated with the first data packet by 1.

30. The non-transitory computer-readable storage medium according to claim 25, wherein the first protocol layer is a radio link control (RLC) layer.

* * * * *

UNITED STATES PATENT AND TRADEMARK OFFICE
CERTIFICATE OF CORRECTION

PATENT NO. : 11,258,545 B2
APPLICATION NO. : 16/779190
DATED : February 22, 2022
INVENTOR(S) : Liu et al.

It is certified that error appears in the above-identified patent and that said Letters Patent is hereby corrected as shown below:

On the Title Page

Page 2: item [56], Other Publications, Column 2, Line 3: "(E-UTRA); Radio Resource Coi irol (RRC); Protocol specification" should read -- (E-UTRA); Radio Resource Control (RRC); Protocol specification --.

In the Claims

Claim 5: Column 24, Line 19: "mission in response to the first protocol layer data" should read -- mission in response to the first data --.

Signed and Sealed this
Twenty-sixth Day of July, 2022

Katherine Kelly Vidal
*Director of the United States Patent and Trademark Office*